(12) United States Patent
Stark

(10) Patent No.: US 10,687,453 B2
(45) Date of Patent: Jun. 23, 2020

(54) AGRICULTURAL IMPLEMENT AND METHOD OF CONTROLLING AN AGRICULTURAL IMPLEMENT

(71) Applicant: Väderstad Holding AB, Väderstad (SE)

(72) Inventor: Crister Stark, Väderstad (SE)

(73) Assignee: Väderstad Holding AB, Väderstad (SE)

( * ) Notice: Subject to any disclaimer, the term of this patent is extended or adjusted under 35 U.S.C. 154(b) by 278 days.

(21) Appl. No.: 15/742,074

(22) PCT Filed: Jul. 5, 2016

(86) PCT No.: PCT/SE2016/050685
§ 371 (c)(1),
(2) Date: Jan. 5, 2018

(87) PCT Pub. No.: WO2017/007412
PCT Pub. Date: Jan. 12, 2017

(65) Prior Publication Data
US 2018/0206387 A1  Jul. 26, 2018

(30) Foreign Application Priority Data
Jul. 7, 2015 (SE) ...................................... 1550989

(51) Int. Cl.
| | | |
|---|---|---|
| *A01B 63/14* | (2006.01) | |
| *A01B 63/00* | (2006.01) | |
| *A01B 49/02* | (2006.01) | |
| *A01B 79/00* | (2006.01) | |
| *A01B 63/111* | (2006.01) | |
| *A01B 69/00* | (2006.01) | |

(52) U.S. Cl.
CPC ............ *A01B 63/008* (2013.01); *A01B 49/02* (2013.01); *A01B 63/111* (2013.01); *A01B 63/14* (2013.01); *A01B 69/004* (2013.01); *A01B 79/005* (2013.01)

(58) Field of Classification Search
CPC ............................ A01B 69/004; A01B 63/008
See application file for complete search history.

(56) References Cited

U.S. PATENT DOCUMENTS 4,825,956 A * 5/1989 Kanato ................ A01B 59/043
172/2
4,912,662 A   3/1990 Butler et al.
(Continued)

FOREIGN PATENT DOCUMENTS

| EP | 1615490 A1 | 1/2006 |
| WO | 2012125109 A1 | 9/2012 |
| WO | 2013026661 A1 | 2/2013 |

*Primary Examiner* — Thomas G Black
*Assistant Examiner* — Ce Li Li
(74) *Attorney, Agent, or Firm* — Coats & Bennett, PLLC

(57) ABSTRACT

This document sets out a method of adjusting an agricultural implement's orientation. The method comprises recording, while the agricultural implement is travelling, a series of orientation values corresponding to the orientation of the agricultural implement in at least one vertical plane, calculating a derived orientation value based on said series of values and, if the derived orientation value is outside a predetermined range, adjusting a mutual position relationship between at least two parts of the agricultural implement that can move relative to each other.

12 Claims, 3 Drawing Sheets

(56) References Cited

U.S. PATENT DOCUMENTS

| | | | |
|---|---|---|---|
| 6,220,366 B1 | 4/2001 | Noonan et al. | |
| 6,651,500 B2 | 11/2003 | Stewart et al. | |
| 2002/0157841 A1* | 10/2002 | Bernhardt | A01B 15/14 172/7 |
| 2004/0149461 A1* | 8/2004 | Ocsenknecht | A01B 63/1117 172/272 |
| 2006/0191250 A1* | 8/2006 | Neuerburg | A01B 69/004 56/6 |
| 2008/0195268 A1* | 8/2008 | Sapilewski | A01B 69/004 701/23 |
| 2009/0187315 A1* | 7/2009 | Yegerlehner | A01B 13/08 701/50 |
| 2015/0245556 A1* | 9/2015 | Prickel | A01C 7/201 701/50 |
| 2016/0255769 A1* | 9/2016 | Leeb | A01C 23/008 |

\* cited by examiner

AGRICULTURAL IMPLEMENT AND METHOD OF CONTROLLING AN AGRICULTURAL IMPLEMENT

TECHNICAL DOMAIN

This document relates to a method of controlling the orientation of an agricultural implement.

The document also relates to soil-working agricultural implements and in particular to agricultural implements for which it is desirable to maintain an even working depth.

BACKGROUND

When using soil-working agricultural implements such as cultivators, harrows, ploughs and sowing machines, or combinations thereof, it is often desirable to maintain a predetermined orientation of the frame of the agricultural implement relative to the ground surface.

In the case of cultivators or harrows, for example, this is to ensure even working over the entire breadth and/or length of the implement.

In the case sowing machines this is to ensure an even sowing depth over the entire breadth and/or length of the implement.

Often this means that it is desirable that the frame of the agricultural implement, or some part therefore, is entirely horizontally orientated given that the agricultural implement is on a horizontal foundation.

Known from WO2012125109A1 for example is controlling of the working depth or the frame height of soil-working agricultural implements with the aid of a hydraulic system.

A method of controlling frame orientation of an agricultural implement is disclosed in WO2013026661A1.

However, it can be difficult to detect whether an agricultural implement is incorrectly set, particularly for a driver who is located in the front cab of the traction vehicle.

It is possible to measure the orientation of the agricultural implement with the aid of spirit levels or similar devices, but for such measurement the agricultural implement has to remain still on a horizontal surface, which can be difficult to achieve when located in field that is to be cultivated and/or sown.

There is therefore a requirement for solutions that make it easier to bring about correct adjustment of the agricultural implement.

SUMMARY

One aim is to bring about a method which makes it easier for users to ensure that the agricultural implement is correctly configured. A particular aim is to bring about a method which can be used in connection with automatic adjustment of the agricultural implement.

The invention is defined by the attached independent claims. Forms of embodiment are evident from the attached dependent claims, the following description and the drawings.

According to a first aspect a method of adjusting a soil-working agricultural implement's orientation is brought about. The method comprising recording, while the agricultural implement is travelling, a series of orientation values corresponding to the orientation of a frame or frame part of the agricultural implement in at least one vertical plane, calculating a derived orientation values based on said series of values and, if the derived orientation value is outside a predetermined range, adjusting a mutual position relationship between at least two parts of the agricultural implement that can be moved relative to each other and/or adjusting a mutual position relationship between the agricultural implement and a partly or fully hauling traction vehicle, calculate the derived orientation value as a mean value of at least a subset of said series of orientation values, and calculate the mean orientation value when the agricultural implement has travelled along a predetermined path, such as closed path, or a path along which the agricultural implement has moved back and forth in parallel rows, such that a mean orientation of the agricultural implement (1) for the predetermined path is provided.

The term "orientation" is taken to means an angular position. The vertical plane can suitably extend across the longitudinal direction of the agricultural implement or along the longitudinal direction direction of the agricultural implement in parallel to a gravitational direction.

A "derived" orientation value can be a mean orientation value which can, but does not have to be weighted with one or more factors.

Recording can take place with the aid of one or more orientation sensors. Calculation can take place in the control unit and adjustment can be brought about through the control unit producing a signal for an actuator, such as a hydraulic actuator, or for a regulating device for hydraulic actuators.

The orientation sensor can be any form of angular position sensor, such as a gyroscope for example.

Through deriving an orientation value based on a series of orientation values it is possible to calculate the agricultural implement's orientation on the assumption that when the agricultural implement has moved for a sufficiently long time or distance its mean orientation should be horizontal with certain tolerances.

The orientation value interval can be determined arbitrarily. For example it may be desired that the agricultural implement is kept horizontal with certain tolerances in the transverse and/or longitudinal direction. For example, it may be desired that the agricultural implement is kept horizontal with certain tolerances in the transverse and/or longitudinal direction.

This applies particularly to agricultural implements which travel in accordance with a pattern where it returns to essentially the same position or direction of travel, such as row patterns ("back and forth") or circular patterns where the shape of a field's outline is followed.

For example, in the case of a travel pattern where the agricultural implement travels in essentially parallel and adjacent lines, back and forth, it can assumed the mean orientation of the agricultural implement 1 is horizontal both in the transverse and longitudinal direction since it travels in opposite directions and returns to essentially the same place.

The same can also apply when travelling along other essentially closed paths.

Said orientation value can be recorded as an angular value based on gravitational direction. For example, an angular value can be recorded in relation to a transverse vertical plane and/or an angular value recorded relative to a longitudinal vertical plane. The number of angular values can be determined from the configuration and adjustment possibilities of the agricultural implement.

The series of orientation values can be measured for one of the movable parts and an actuator can be activated to set the position of the parts relative to each other and to achieve an orientation value which is within the predetermined range.

The actuator can be activated on the basis of a user command or automatically as a result of the derived orientation value being outside the acceptable orientation range.

The method can also comprise recording of another orientation value corresponding to the orientation of another of the movable parts in said vertical plan and calculating an adjusting value based on which the actuator is to be set in order to achieve an orientation value which is within the predetermined range.

By obtaining orientation values for the other part it is possible to calculate how much adjustment needs to be done. Alternatively adjusting with feedback only from the frame section the adjusting relates to would involve a long time between the adjustment and feedback.

The derived orientation value can be a mean value of at least a subset of said series of orientation values.

The method can also comprise recording a series of travel values which represent the travel of the agricultural implement, wherein each travel value can be associated with a respective orientation value in said series of orientation values, and wherein said mean orientation value can be derived on the basis of said travel value.

The travel value can be selected from a group comprising a travel time, travel distance and geographical position.

Recording can be carried out during a partial range of the agricultural implement's travel.

"Partial range" is take, for example, to mean a predetermined time, a predetermined distance, a predetermined path or a predetermined area.

For example, calibration can be initiated automatically in accordance with a predetermined criterion or through a user input.

Such a predetermined criterion can, for example, include the agricultural implement being driven for a certain time, a certain distance or it returning to a certain position and possibly also a certain direction of travel.

Time, distance and position criteria can be selected to maximise the probability that the implement has travelled over a sufficiently large area for dispensing to have reliably been able to be carried out.

The mutual position relationship can involve the position of at least one soil-working part in relation to a frame or a part of the frame of the agricultural implement.

According to a second aspect an agricultural implement for soil-working is brought about comprising at last two parts that can be moved relative to each other. The agricultural implement comprises at least one sensor for detecting an orientation value of a frame or frame part of the agricultural implement in at least one vertical plane, at least one actuator for setting a mutual position of the parts relative to each other and a control unit set to record, while the agricultural implement is travelling, a series of orientation values, calculate a derived orientation value based on said series of values, produce a control signal for the actuator for adjusting said mutual position if the the derived orientation value is outside a predetermined acceptable range, calculate the derived orientation value as a mean value of at least a subset of said series of orientation values, and calculate the mean orientation value when the agricultural implement has travelled along a predetermined path, such as closed path, or a path along which the agricultural implement has moved back and forth in parallel rows, such that a mean orientation of the agricultural implement (1) for the predetermined path is provided.

The parts can each be provided with orientation sensors and the control unit can be configured to produce the control signal based on signals from said orientation sensors.

According to a third aspect a system for soil working is brought about comprising a traction vehicle, which at least partly hauls an agricultural implement for soil working, comprising at least one sensor for the detection of one orientation value for a frame or frame part of the agricultural implement in at least one vertical plane, at least one actuator for adjusting a mutual position between the traction vehicle and the agricultural implement, and a control unit. The control unit is configured to record, while the agricultural implement is travelling, a series of orientation values, calculate a derived orientation value based on said series of values, produce a control signal for the actuator for adjusting said mutual position if the derived orientation value is outside a predetermined acceptable range, calculate the derived orientation value as a mean value of at least a subset of said series of orientation values, and calculate the mean orientation value when the agricultural implement has travelled along a predetermined path, such as closed path, or a path along which the agricultural implement has moved back and forth in parallel rows, such that a mean orientation of the agricultural implement (1) for the predetermined path is provided.

It is evident that the actuator can be arranged on the traction vehicle and/or on the agricultural implement or in between them. The control unit can also be arranged on the traction vehicle and/or on the agricultural implement.

DETAILED DESCRIPTION

Figure 1:
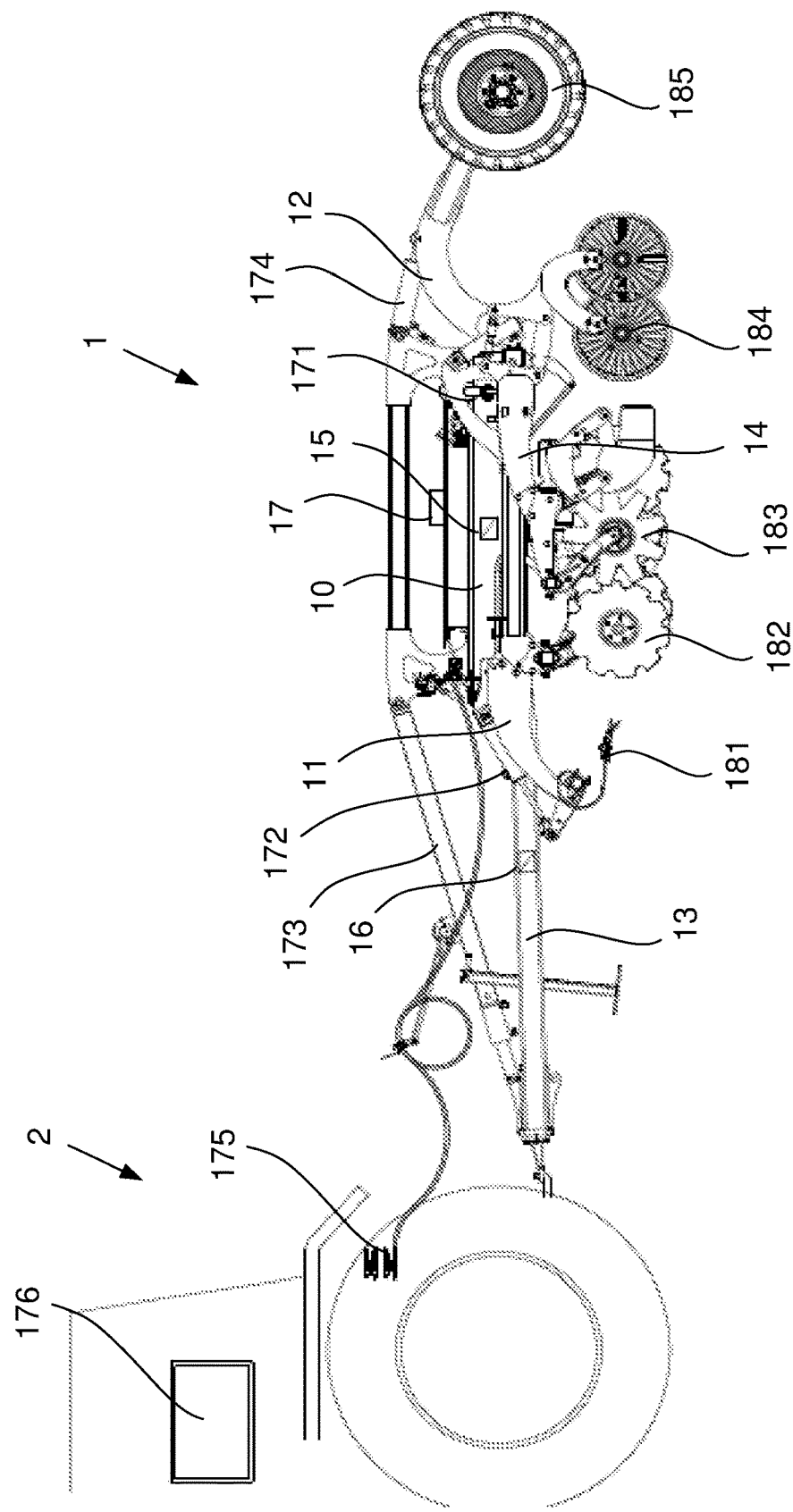
FIG. 1 is a schematic side view of an agricultural implement in the form of a cultivator.
Figure 2:
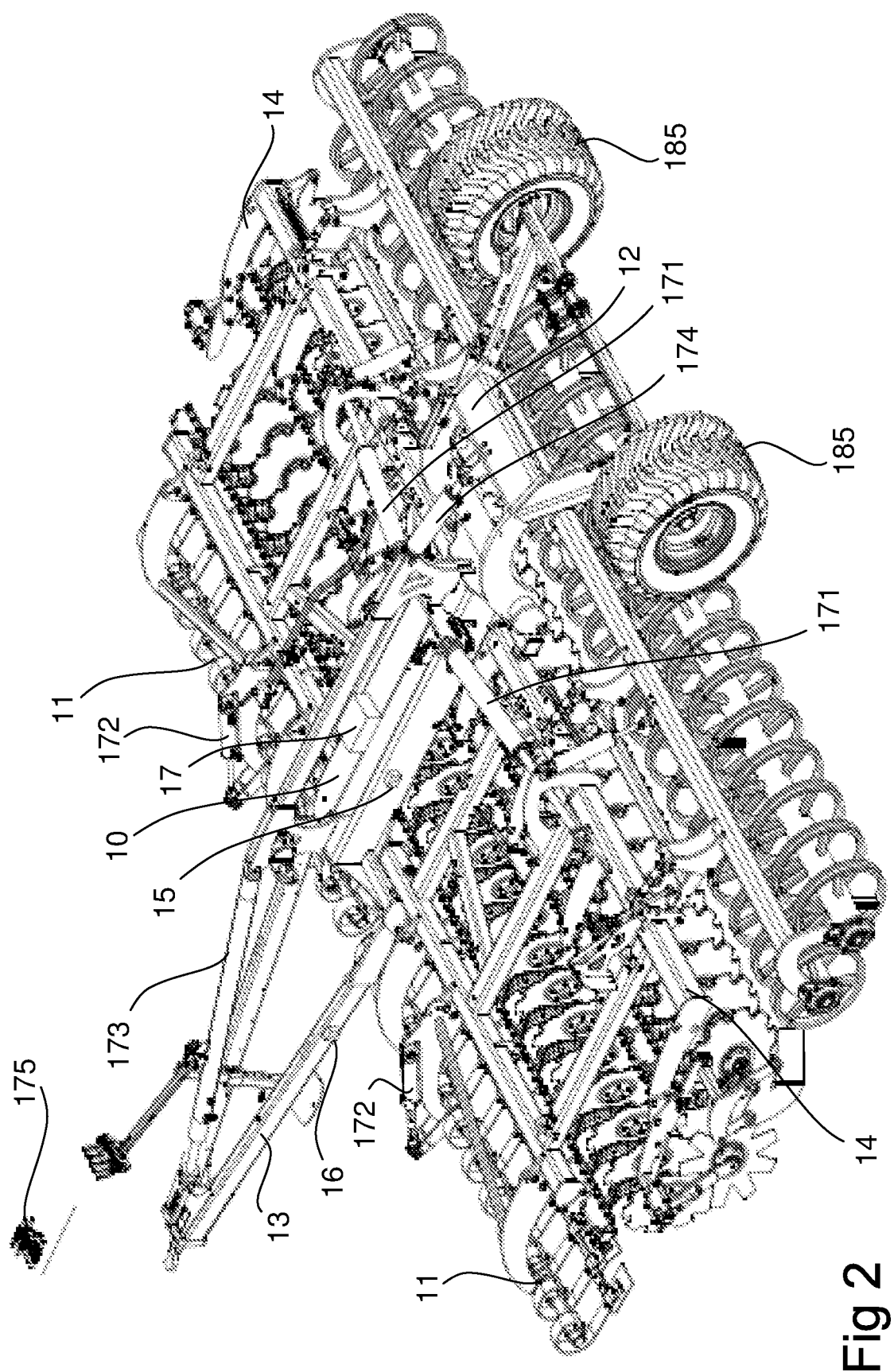
FIG. 2 is a schematic perspective view of the agricultural implement in FIG. 1.

The description is provided with reference to a disk cultivator 1 as shown in FIGS. 1 and 2. However, what is described herein can also be applied to other types of agricultural implements, such as harrows, ploughs, sowing machines or other machines for dispensing granular material to the soil or combinations thereof.

A disk cultivator 1 comprises a frame 10, 11, 12, 13, 14 which can include several parts which are movable relative to each other, by way of joints for example. The movability can be controlled by one or more actuators which are normally in the form of a hydraulic actuator 171, 172, 173, 174.

Hydraulic actuators and their control are known and will not be described in further detail.

The frame 10, 11, 12, 13, 14 can for example comprise a main frame 10 and a towing device 13 for connection to a traction vehicle 2, such as a tractor, and, possibly, one or more side sections 14, one or more forward sections 11 and/or one or more rear sections 12. The main frame 10 and towing device 13 can be movable in a controlled manner relative to each other, such as the main frame 10 and one or more of the side sections 14, front sections and/or rear sections 12.

One or more soil-working parts 181, 182, 183, 184, 185 can be arranged on the main frame, side sections, front section or rear sections. Such soil-working parts can comprise soil-working tools such as harrow tines, cultivator tines, levelling tools 181, disc tools 182, ploughshares 286, 286*b* (FIG. 3), pack wheels, rollers 184, sowing trucks, fertiliser trucks or row units for sowing or dispensing other material to the soil. Soil-working parts can also include support wheels 185, 285 for transporting and/or depth setting.

One or more orientation sensors 15, 16 can be arranged on one or more of the frame parts 10, 13.

Such an orientation sensor 15, 16 can be configured to detect the orientation of a frame part in one or more vertical planes, for example a vertical plane perpendicular to the direction of travel of the agricultural implement and/or a vertical plane parallel to the direction of travel of the agricultural implement. For example, respective orientation sensors can produce a signal corresponding to the agricultural implement's orientation relative to a gravitational direction. The signal can be processed so that instead it reflects the implement's angular position relative to a horizontal plane which is, as is known, perpendicular to the gravitational direction.

The orientation sensors 15, 16 can be arranged in their associated frame section 10, 13 so that a predetermined orientation value is brought about when the frame section is in a desired position.

The orientation sensors 15, 16 can have one axle, two axles or three axles and can be combined with other types of sensors such as accelerometers.

For example an orientation sensor 15 of a frame section 10 can be configured to indicate an orientation of 0° in both the transverse and longitudinal plane when the main frame section 10 is horizontally orientated.

Another frame section can also be provided with an orientation sensor. In the illustrated example the drawbar 13 is provided with an orientation sensor 16.

It is evident that the agricultural implement can be be built up in many different configurations, usually as a main frame with one or two side section on each side, or as a frame divided along the agricultural implement's longitudinal midline, which thus consists of two side sections.

In the shown example there are for instance side sections 14 which can be turned about longitudinal horizontal axes relative to the main frame 10 and which can be adjusted individually with the aid of a hydraulic actuator 171, a frame section can be adjusted individually relative to the main frame 10 with the aid of a hydraulic actuator 172 a drawbar 13 which can be adjusted relative to the main frame 10 with the aid of a hydraulic actuator 173 and a rear section 12 which can be adjusted relative to the main frame 10 with the aid of a hydraulic actuator 174.

Through activating a hydraulic actuator 173 the angle of the drawbar relative to the main frame 10 can be adjusted which means that the angular position of the entire agricultural implement seen in a longitudinal vertical plane can be adjusted.

It is clear that front and/or rear frame sections can be connected to the respective side sections, i.e. a front or rear frame section can be rotatably connected to a side section and thus controlled in a moveable manner relative to the side section.

The orientation sensors 15, 16 are actively connected to a control unit 17 which receives the measuring values from the orientation sensors. The control unit can have a memory for storing the measurements and a processing unit for performing calculations based on the measurements and to producing output data based on the calculations. Examples of output data can be user information relating to the orientation of the agricultural implement and/or control signals for adjusting the settings of the agricultural implement. The control unit can also be connected to a user interface for inputting user commands and outputting feedback to the user. For example, such a user command can cancel or disregard commands produced by the control unit 19, such as adjusting the angular position of the frame sections 10, 11, 12, 13, 14.

In turn, the control unit 17 can be connected via cables 175 or wirelessly to a main control unit on the traction vehicle and/or to a user interface. An user interface can for example be in the form of a computer, an e-reader (such as an iPad) 176 or similar device.

Feedback to the user can include the setting status, such as an indication that the agricultural implement is correctly set. Alternatively, the feedback can involve showing a setting error and exhorting the user to manually input the correction value.

While the agricultural implement 1 is travelling the control unit 17 receives a series of values from each and every one of the orientation sensors. The orientation values include the orientation value a transverse vertical plane and/or the orientation value in a longitudinal vertical plane.

For example the orientation value in the transverse vertical plane can be produced for an agricultural implement 1 which is able to adjust soil-working parts differently over the breadth of the agricultural implement.

In the same way the orientation value in the longitudinal vertical plane can be produced for an agricultural implement 1 which is able to adjust soil-working parts differently over the length of the agricultural implement.

With each reading one orientation value can thus come about in the lateral direction and one orientation value in the longitudinal direction, which together can be said to form an orientation vector for the agricultural implement. Reading can take place at predetermined time intervals, for example with a frequency of 0.1-10 Hz or based on another criterion, such for example position or travel path, e.g. 5 times per metre travelled.

The orientation values are stored in a data memory, whereby calculation of a mean orientation in respective vertical planes can be carried out in accordance with a predetermined criterion.

For example, the mean orientation can be calculated on the basis of a predetermined number of orientation values. Such calculation can take place at predetermined intervals or as a movable mean value and is then based on a certain number of most recently gathered orientation values.

Another alternative is to calculate the mean orientation value at even intervals or when the agricultural implement has completed a certain path.

Yet another alternative is to calculate the mean orientation value when the agricultural implement has travelled along a predetermined path, such as closed path, or a path along which the agricultural implement has moved back and forth in parallel rows. A GPS or a similar positioning system can be used to record the agricultural implement's position and travel path.

Combinations of the above criteria are possible.

It is possible to set tolerances, meaning that adjustment only takes place if the calculated mean orientation value is outside a predetermined interval.

Conceivable tolerance intervals can be +/−5°, +/−3°+/−2° or +/−1°.

Adjustment of the agricultural implement's orientation can take place as a response to a deviation from the acceptable tolerance interval being measured. The extent of the adjustment can be calculated on the basis of the magnitude of the orientation value.

Adjustment can thus take place an even intervals, after a certain distance or when the agricultural implement has completed a certain path.

Figure 3:
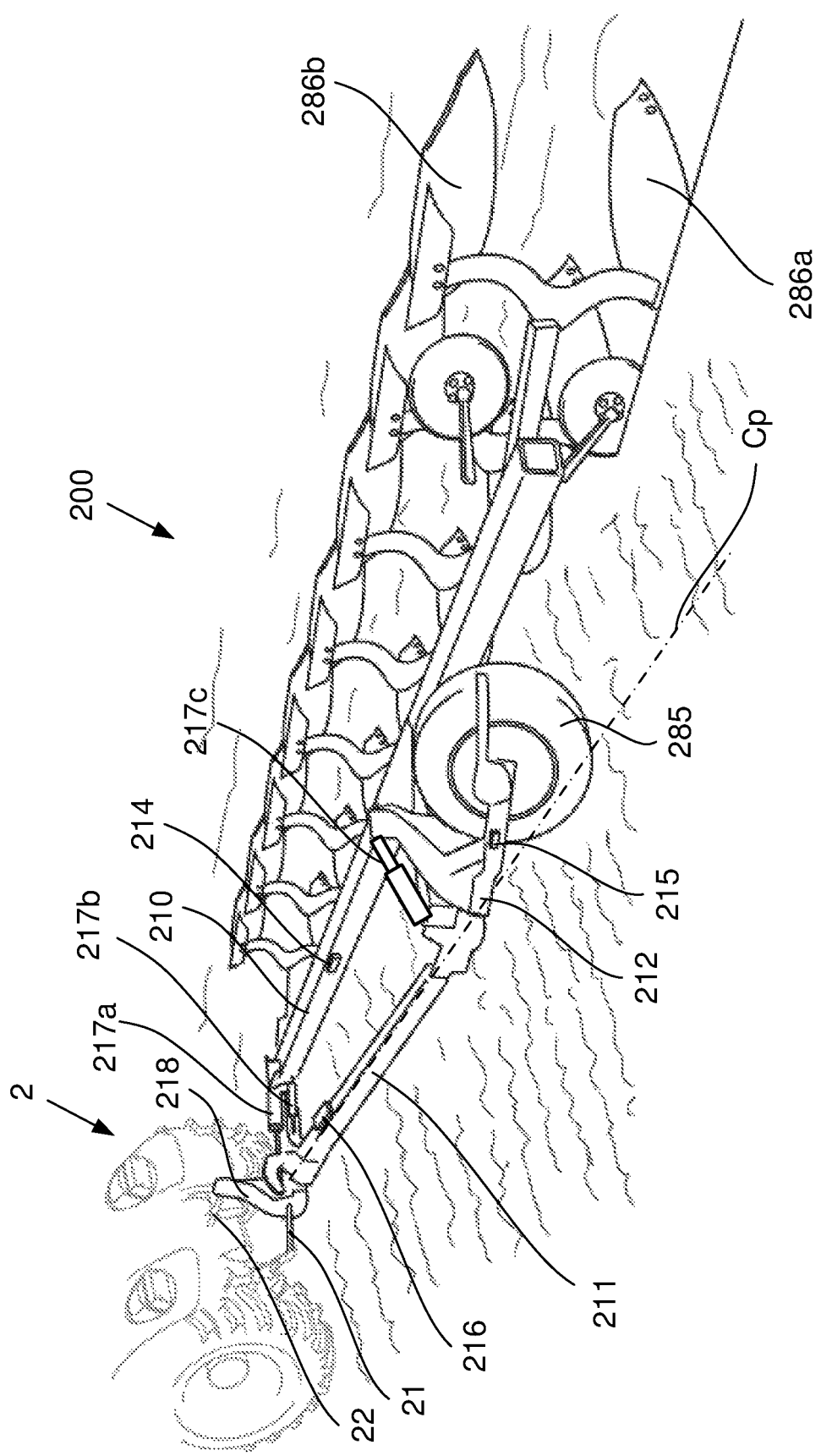
FIG. 3 is a schematic perspective view of an agricultural implement in the form of a plough.

In FIG. 3 an agricultural implement in the form of a plough 200 (more particularly a reversible plough) is shown. The plough 200 comprises a main frame 210 which carries a number of ploughshares 206a, 286b and a side frame and in some embodiments also a wheel frame 212 which carries a support wheel 285.

As a rule the plough 200 has a coupling device 218 which is suspended in hydraulic arms 21 of the tractor 2. Such suspension can be torque-resistant in at the least vertical direction. Depending on the design of the plough (often related to its size) it can thus be fully or partially suspended on the hydraulic arms 21 of the tractor. Irrespective of which, the tractor's hydraulic arms can be used to fully or partially adjust the orientation of the plough.

The main frame 210 can be rotatable about a horizontal axle which is essentially parallel to the direction of travel of the agricultural implement so that ploughshares 286a and 286b can alternately engage with the soil.

An orientation sensor 214, 215 can be arranged on one or more of the frame parts in order to detect the orientation of the relevant frame section. In addition, a control unit 216 can be arranged on one of the frame sections, for example on a frame section which is configured to maintain its orientation irrespective of which of the ploughshares 286a, 286b is engaged in the soil.

One or more actuators 217a, 217b can be arranged to control the mutual position of the frame parts 210, 211, 212.

For this one or more actuators can be arranged to control the tractor's hydraulic arms which can also be used to fully or partially (for example together with a support wheel 285) control the orientation of the plough 200.

In the shown example a first actuator 217a can be arranged for changing the plough's direction around an axle Cp parallel to the direction travel.

Another actuator 217b can be provided for adjusting the furrow width, i.e. the angle of the main frame 210 relative to the direction of travel.

A third actuator 217c can be provided for adjusting the height of the wheel 285 relative to the frame, i.e. to adjust the working depth of the plough.

Furthermore, the hydraulic arms 21 of the traction vehicle 2 can be arranged to adjust the height of the frame relative to the traction vehicle.

By adjusting the height position of the wheel 286 and the height position of the hydraulic arms 21 the orientation of the plough 200 can be controlled in a vertical plane parallel to the direction of travel.

An agricultural implement 1, 200 can thus be clamped in a torque-resistant manner relative to the traction vehicle in at least one horizontal plane.

In a fully caged agricultural implement (not shown) the upper fastening point 22 or the traction vehicle, which can be individually controlled by means of an actuator (not shown), can be used for adjusting the orientation of the agricultural implement in a vertical plane parallel to the direction of travel.

An agricultural implement 1, 200 can thus also be clamped in a torque-resistant manner relative to the traction vehicle in a vertical plane.

Through gathering and processing orientation data as described above, it can be ensured that the frame sections 10, 11, 12, 13, 14, 15, 210, 211, 212 can maintain a predetermined orientation through the activation of the actuators 171, 172, 173, 174, 217a, 217b, 217c.

The plough 200 can be controlled via the same type of interface as the disk cultivator discussed above.

It is clear that other types of soil-working agricultural implements can also be controlled in the same way.

The invention claimed is:

1. A method of adjusting an orientation of a soil-working agricultural implement, comprising:
    recording, while the agricultural implement is moving, a series of orientation values corresponding to an orientation of a frame or frame part of the agricultural implement in at least one vertical plane,
    calculating a derived orientation value based on said series of values and
    if the derived orientation value is outside a predetermined acceptable orientation value interval, adjusting a mutual positional relationship between at least two parts that can be moved relative each other on the agricultural implement and/or adjusting a mutual positional relationship between the agricultural implement and a traction vehicle fully or partially pulling it,
    wherein the derived orientation value comprises a mean value of at least a subset of said series of orientation values, and
    wherein a mean orientation value is calculated when the agricultural implement has travelled along a predetermined path, or a path along which the agricultural implement has moved back and forth in parallel rows, such that the derived orientation value is provided as a mean orientation of the agricultural implement for the predetermined path.

2. The method according to claim 1, wherein each of said orientation values are recorded in a form of an angular value based on a gravitational direction.

3. The method according to claim 1, wherein said series of orientation values is measured for at least one of the parts that can be moved relative to one another and wherein an actuator is activated to set a position of the parts relative to each other and to achieve an orientation value which is within the predetermined acceptable orientation value interval.

4. The method according to claim 1, also comprising:
    recording another orientation value corresponding to an orientation of another of the parts that can be moved relative to one another in said vertical plane; and
    calculating an adjusting value, said adjusting value based on which an actuator is to be set in order to achieve an orientation value which is within the predetermined acceptable orientation value range.

5. The method according to claim 4, wherein the mutual position relationship involves positions of a pair of frame parts relative to each other.

6. The method according to claim 1, also comprising recording a series of travel values which represent a travel of the agricultural implement, wherein each travel value is associated with a respective orientation value in said series of orientation values, and wherein an average orientation value is also derived on the basis of said travel value.

7. The method according to claim 6 wherein the travel value is selected from a group comprising a travel time, a travelled distance and geographical position.

8. The method according to claim 1, wherein the recording is carried out during a partial range of a travel of the agricultural implement.

9. The method according to claim 1, wherein the mutual position relationship involves a position of at least one soil-working part in relation to a frame or a part of the frame of the agricultural implement.

10. An agricultural implement for soil working comprising at least two parts that can be moved relative to each other, comprising:
- at least one sensor for detecting an orientation value of a frame or frame part of the agricultural implement in at least one vertical plane,
- at least one actuator for setting a mutual position of the parts and
- a control unit configured to:
  - record a series of orientation values while the agricultural implement is travelling;
  - calculate a derived orientation value based on said series of values;
  - produce a control signal for the actuator to adjust said mutual position if the derived orientation value is outside a predetermined, acceptable orientation value interval range; and
- calculate the derived orientation value as a mean value of at least a subset of said series of orientation values; and
- calculate a mean orientation value when the agricultural implement has travelled along a predetermined path, or a path along which the agricultural implement has moved back and forth in parallel rows, such that an orientation of the agricultural implement for the predetermined path is provided.

11. The agricultural implement according to claim 10, wherein the parts are equipped with respective orientation sensors and wherein the control unit is configured to produce the control signal based on signals from said orientation sensors.

12. A system for soil working comprising a traction vehicle which at least partially pulls an agricultural implement for soil working, comprising:
- at least one sensor for detecting an orientation value of a frame or frame part of the agricultural implement in at least one vertical plane;
- at least one actuator for setting a mutual position between the traction vehicle and the agricultural implement; and
- a control unit configured to:
- record a series of orientation values while the agricultural implement is travelling;
- calculate a derived orientation value based on said series of values;
- produce a control signal for the actuator to adjust said mutual position if the derived orientation value is outside a predetermined, acceptable orientation value interval;
- calculate the derived orientation value as a mean value of at least a subset of said series of orientation values; and
- calculate a mean orientation value when the agricultural implement has travelled along a predetermined path, or a path along which the agricultural implement has moved back and forth in parallel rows, such that a mean orientation of the agricultural implement for the predetermined path is provided.

* * * * *